(12) United States Patent
Sun

(10) Patent No.: US 6,774,838 B2
(45) Date of Patent: Aug. 10, 2004

(54) POWER SAVING DEVICE AND METHOD FOR GPS RECEIVER

(75) Inventor: Chun-I Sun, Taipei Hsien (TW)

(73) Assignee: Kinpo Electronics, Inc., Taipei (TW)

( * ) Notice: Subject to any disclaimer, the term of this patent is extended or adjusted under 35 U.S.C. 154(b) by 0 days.

(21) Appl. No.: 10/329,347

(22) Filed: Dec. 27, 2002

(65) Prior Publication Data

US 2004/0125014 A1 Jul. 1, 2004

(51) Int. Cl.[7] .................................. G01S 5/02
(52) U.S. Cl. ............................. 342/357.06
(58) Field of Search ............... 342/357.06, 357.08, 342/357.12; 701/213

(56) References Cited

U.S. PATENT DOCUMENTS

| | | | | |
|---|---|---|---|---|
| 5,448,773 A | * | 9/1995 | McBurney et al. ......... 455/343 |
| 5,493,498 A | * | 2/1996 | Miyoshi ..................... 364/449 |
| 5,650,785 A | * | 7/1997 | Rodal ......................... 342/357 |
| 5,857,155 A | * | 1/1999 | Hill et al. .................. 455/456 |
| 6,067,044 A | * | 5/2000 | Whelan et al. ......... 342/357.07 |
| 6,121,921 A | * | 9/2000 | Ishigaki ..................... 342/357 |
| 6,133,871 A | * | 10/2000 | Krasner ................. 342/357.06 |
| 6,384,774 B1 | * | 5/2002 | Mutoh et al. .......... 342/357.06 |
| 6,480,557 B1 | * | 11/2002 | Rog et al. .................... 375/349 |
| ,139,879 A1 | * | 7/2003 | Krasner ..................... 701/213 |

* cited by examiner

Primary Examiner—Dao Phan
(74) Attorney, Agent, or Firm—Troxell Law Office PLLC

(57) ABSTRACT

A power saving device and method for a GPS receiver is provided to have the GPS receiver being connected to an oscillation switch and the vibration generated from moving the GPS receiver can be utilized to actuate the oscillation switch so as to turn on the power of the GPS receiver automatically with a power controller. The oscillation switch makes the power controller turning off the power of the GPS receiver automatically so that the power can be saved economically.

5 Claims, 3 Drawing Sheets

POWER SAVING DEVICE AND METHOD FOR GPS RECEIVER

BACKGROUND OF THE INVENTION

1. Field of the Invention

The present invention relates to a global positioning system receiver (GPS receiver), and particularly to a power saving device and a method thereof for a GPS receiver.

2. Description of Related Art

Conventionally, the location of a GPS receiver is calculated by means of the GPS receiver receiving positional data sent by at least four GPS satellites. Because the GPS receiver is getting popular, it is widely applied for guiding a vehicle and registering a moving track thereof. In order to offer the vehicle a correct position constantly, the GPS receiver has to be in a state of alert and the power is wasteful.

The U.S. Pat. No. 5,592,173 discloses a GPS receiver having a low power standby mode, which allows the user to select the standby mode of the GPS receiver for saving the power in accordance with the correlation information and location information provided by a microprocessor.

Although the power saving for the GPS receiver can be performed by standby mode switched manually in the preceding U.S. Patent, a much better effect for saving the power can be attained if the GPS receiver is turned on or off automatically in accordance with the vehicle in a actual state of stopping or moving.

For instance, the GPS receiver is shut during the vehicle stopping and is started at the moment ready for moving. Further, the GPS receiver is turned off and on a time interval of five minutes alternately in case of the vehicle is moving in a high speed for a long duration such as being driven an hour continuously with a speed exceeding 80 Km/hour and then the GPS receiver can be shut at the time of receiving a positional data. Under this condition, a function of saving power also can be obtained without affecting the guidance of vehicle and the moving track register.

SUMMARY OF THE INVENTION

A primary object of the present invention is to provide a power saving device for a GPS receiver, which can start to run automatically during the GPS receiver generating vibration due to moving and be off automatically during the GPS receiver being stationary due to stop moving.

Another object of the present invention is to provide a power saving method for a GPS receiver, with which the GPS receiver can be controlled to turn off and turn on after a time interval sequentially during a vehicle moving a long period of time and the moving speed thereof exceeding a preset value.

BRIEF DESCRIPTION OF THE DRAWINGS

The present invention can be more fully understood by reference to the following description and accompanying drawing, in which.

DETAILED DESCRIPTION OF THE PREFERRED EMBODIMENT

Figure 1:
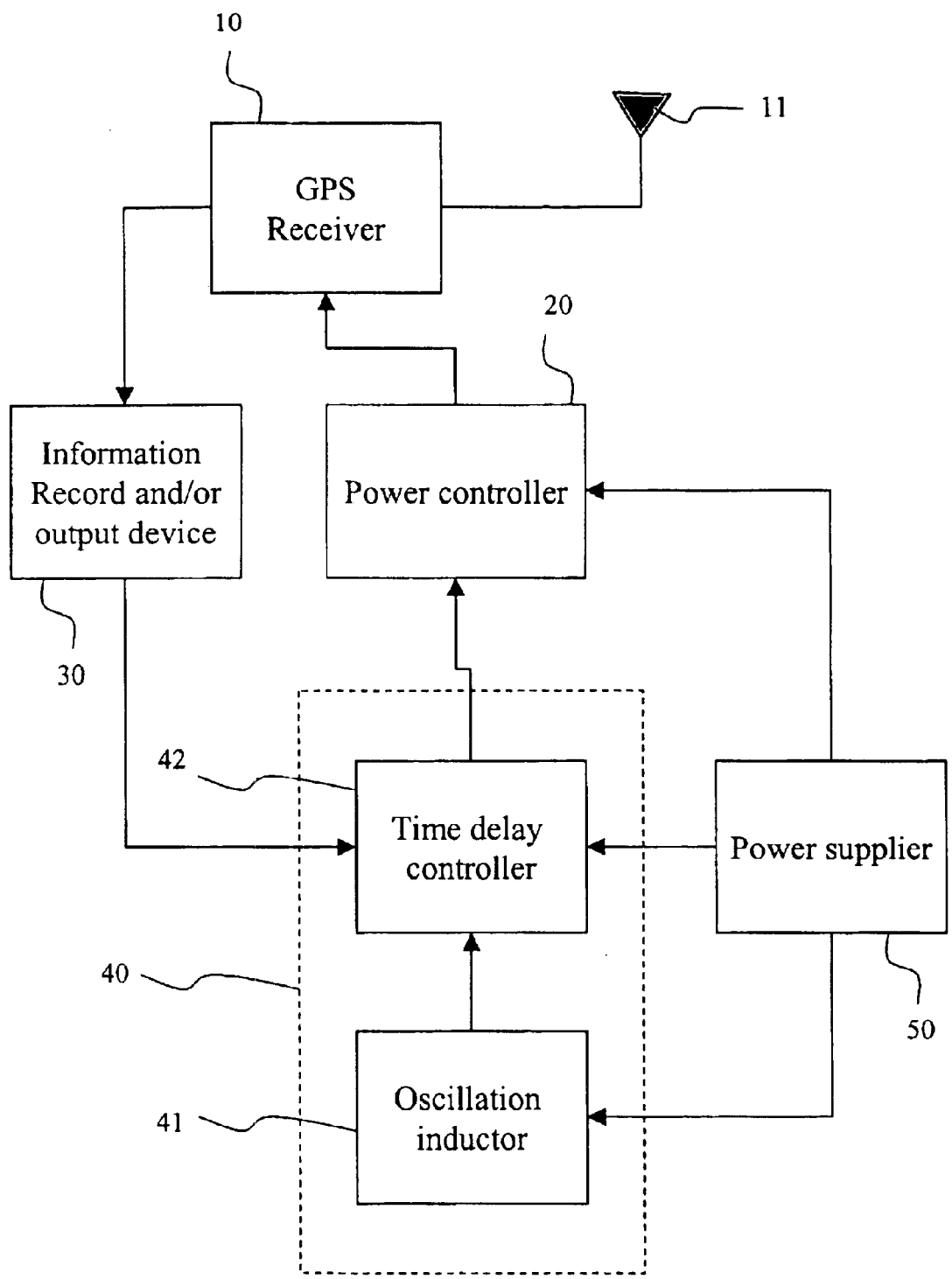
FIG. 1 is a functional block diagram of a power saving device for a GPS receiver according to the present invention.

Referring to FIG. 1, a GPS receiver 10 of the present invention connects with a GPS antenna, a power controller 20 and a information record and/or output device 30. The power controller 20 further connects with an oscillation switch 40 and both the power controller 20 and the oscillation switch 40 are connected to a power supplier 50. The oscillation switch 40 includes an oscillation sensor 41 and a time delay controller 42, which are connected to each other and to the power supplier 50. The time delay controller 42 further connects with the power controller 20 and the information record and/or output device 30.

The time delay controller 42 may be a controller of an ordinary RC discharge control circuit or logic circuit in responsible for controlling the power supplying to the GPS receiver 10. The oscillation sensor 41 can be an ordinary mercury oscillation switch, a rolling ball switch or any switch, which can produce an ON/OFF signal during being oscillated.

The oscillation switch 40 is utilized to sense the GPS receiver 10 during the GPS receiver 10 being in a state of stop moving or moving. When the GPS receiver 10 is in a state of stop moving, the oscillation sensor 41 is stationary and the time delay controller 42 sends out an OFF signal. When the GPS receiver 10 is in a state of moving, the oscillation sensor 41 of the oscillation switch 40 can send out ON/OFF signals continuously to the time delay controller 42 such that the time delay controller 42 outputs the ON signal continuously. The power controller 20 can start or shut the GPS receiver 10 based on the ON signal or the OFF signal as soon as an ON or an OFF signal sent out of the oscillation switch 40 has been detected by the power controller 20.

The information record and/or output device 30 has a CPU to process and operate the positional signal transmitted from the GPS receiver 10 and provides a self-powered timer. The information record and/or output device 30 can send out the OFF or the ON signal sequentially following a preset time interval once the moving time and the moving speed of the GPS receiver 10 exceed the respective original set time. When the ON or OFF signals are detected by the power controller 20, the GPS receiver 10 is controlled to turn off or keep in a state of ON.

Figure 2:
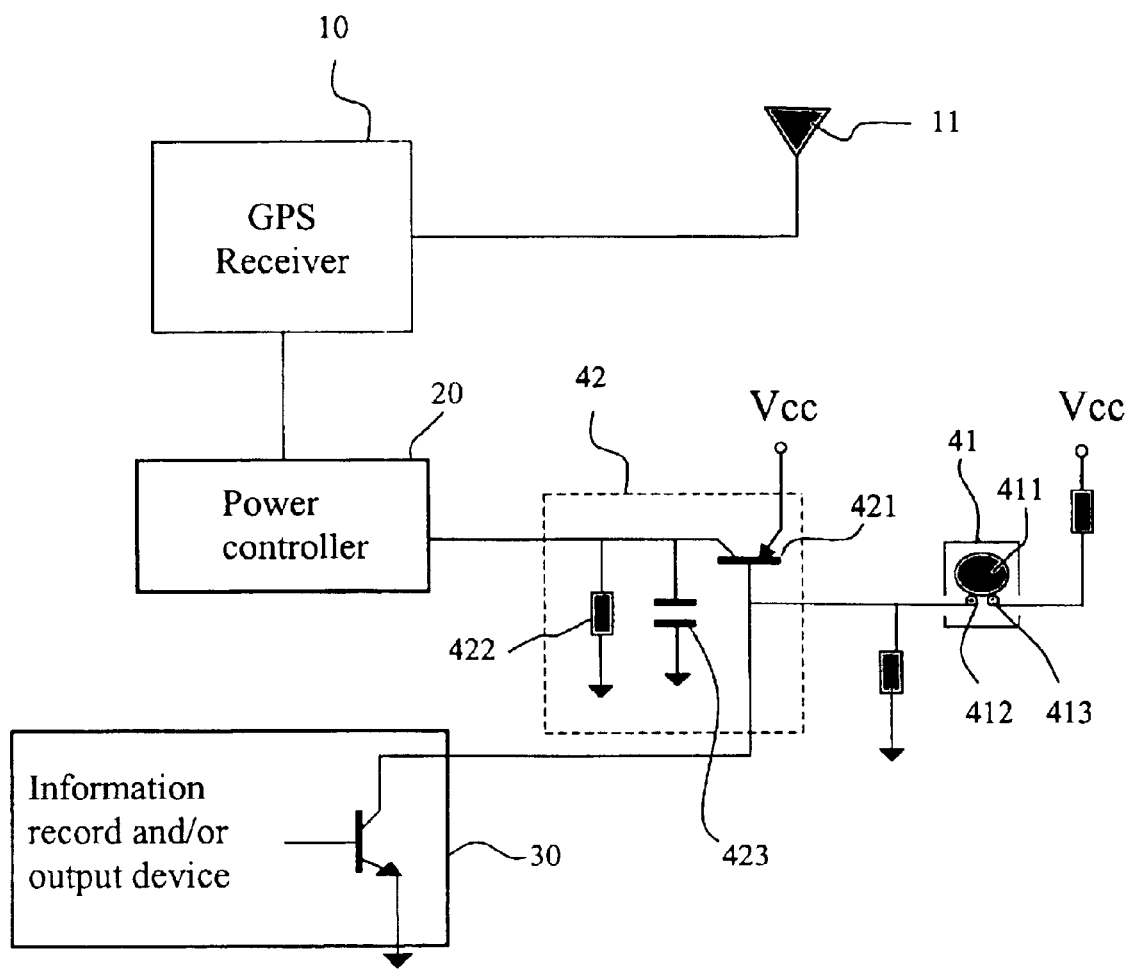
FIG. 2 is a block diagram of power saving device for a GPS receiver according to the present invention in an embodiment thereof.

Referring to FIG. 2, an embodiment of the present invention is illustrated. The oscillation sensor 41, which is an ordinary mercury oscillation switch or a rolling ball oscillation switch, includes mercury or a rolling ball 411 and opposite nodes 412, 413. A ON or OFF signal can be produced as soon as the mercury or the rolling ball 411 touches or detaches opposite nodes 412, 413. The time delay controller 42 includes a transistor 421, a resistor 422 and a capacitor 423. An emit end of the transistor 421 connects with the power source and a collect end thereof connects with the power controller 20. The resistor 422 and the capacitor 423 at a respective end thereof are grounded and at respective another end thereof connects with the collect end of the transistor 421. The oscillation sensor 41 and the information record and/or output device 30 are connected to a base end of the transistor 421 respectively. When the ON signal is generated in case of the oscillation sensor 41 not sending out a high potential or the information record and/or output device 30 sending out a low reinforcing potential, it makes the emit end and the collect end of the transistor 421 connecting with each other to result in the collect end being in a state of high potential and the capacitor 423 being recharged. Meanwhile, the ON signal is detected with the power controller 20 such that the GPS receiver 10 can be actuated to start. When the OFF signal is generated in case of the oscillation sensor 41 sending out a high potential and the information record and/or output device 30 did not send out a low reinforcing potential, the emit end and the collect end of the transistor 412 are not connected to each other and the potential of the collect end becomes a low potential via the capacitor 423 gradually discharging through the resistor 422 such that the OFF signal is detected with the power controller 20 so as to shut the GPS receiver 10. The discharge rate of the capacitor 423 can be adjusted by way of selecting different resistor 422 and the capacitor 423 so as to control the time duration for changing the potential of the collect end to a low potential. If the oscillation sensor 41 sends out the ON signal to the time delay controller 42 before the potential of the collect end being changed to the low potential, the time delay controller 42 can send out the ON signal continuously. The information and/or output device 30 keeps sending out the ON signal before the record and/or output being completed. Further, when the information record and/or output device 30 sends out a low reinforcing potential, said low reinforcing potential forces the time delay controller 42 to send out the ON signal till said record and/or output being completed even if the oscillation sensor 41 is sending out the OFF signal.

Figure 3:
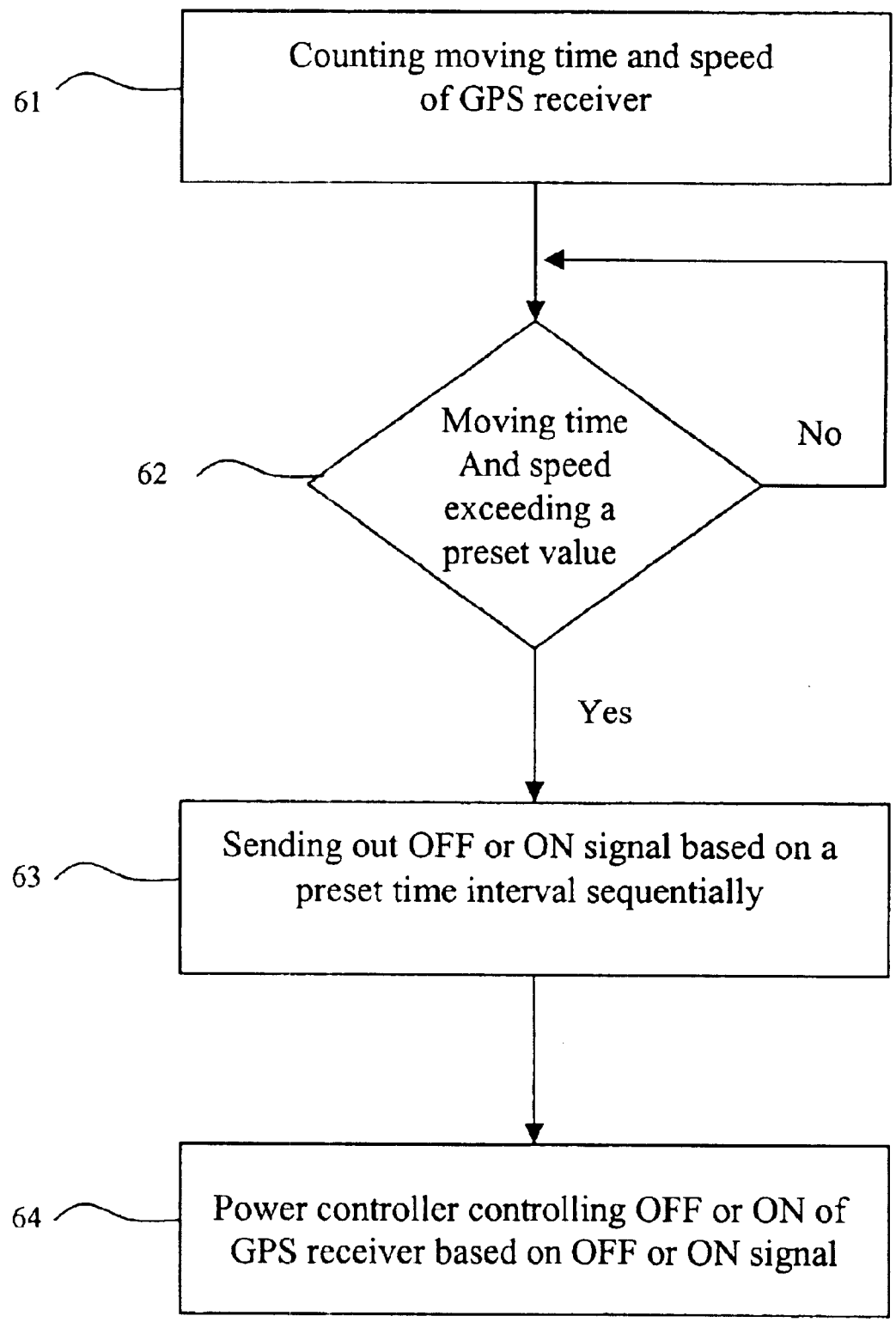
FIG. 3 is a flow chart of a power saving method according to the present invention.

Referring to FIG. 3, a method of saving power for a GPS receiver according to the present invention is shown in the flow chart includes the following steps:

Step 61: A information record and/or output device can count the moving time and the speed of the CGS receiver based on the data sent by the GPS receiver;

Step 62: Detect if the moving time and the speed of the GPS receiver exceed a respective preset value. The operation of detection continues in case of the preset values are higher than the detected values. It has to go to next step in case of the present value being less than the detected values;

Step 63: The information record and/or output device sends out an OFF or ON signal sequentially in accordance with the duration of the preset time; and Step 64: The power controller actuates the GPS receiver to be OFF or ON based on the OFF and the ON signal;

For instance, the method of the present invention can used to set a time interval of 5 minutes for sending out the OFF and the ON signals sequentially while the GPS receiver moves continuously over an hour with a moving speed of 80 km/h. In this way, the power controller can actuate the GPS receiver to be OFF or ON every five minutes alternately such that the effect of power saving can be obtained substantially.

The oscillation sensor is utilized in the present invention to control the GPS receiver in a state of running during moving and being in a state of shutting during stop moving and control the GPS receiver being intermittently off the power periodically during moving in a long period of time and in a high speed such that the power required by the GPS receiver can be saved more effectively.

While the invention has been described with reference to a preferred embodiment thereof, it is to be understood that modifications or variations may be easily made without departing from the spirit of this invention, which is defined by the appended claims.

What is claimed is:

1. A power saving device for a GPS receiver, comprising:
a GPS receiver;
a power controller, being connected to the GPS receiver; and
an oscillation switch, being connected to the power controller;
wherein, the oscillation switch can sense the GPS receiver being a stationary state or a moving state and sends out an OFF or an ON signal with respect to the stationary state or the moving state so that the power controller can control the GPS receiver to be OFF or ON based on the OFF or the ON signal,
wherein the oscillation switch further comprises an oscillation sensor and a time delay controller connected to the oscillation sensor; and when the oscillation sensor is in a state moving, the oscillation sensor sends the ON/OFF signal continuously to the time delay controller such that the time delay controller can send out an ON signal continuously, wherein the time delay controller comprises a transistor with a collect end and a base end, a resistor with two ends and a capacitor with two ends; the collect end is connected to the power controller and both of the resistor and the capacitor at one of the ends thereof are grounded and at another one of the ends are connected to the collect end; and the oscillation sensor and an information record and/or an output device are connected to the base end.

2. The power saving device for a GPS receiver according to claim 1, wherein the GPS receiver further connects with the information record and/or the output device.

3. The power saving device for a GPS receiver according to claim 2, wherein the information record and/or the output device further connects with the base end of the transistor; the information record and/or the output device can process and operate a positional signal sent by the GPS receiver; when the moving time and the moving speed exceed a preset value respectively, the information record and/or output device can send out the OFF and the ON signals sequentially following a preset time interval; and the power controller can control the GPS receiver to be OFF or ON based on the OFF or the ON signal, which has been detected by the power controller.

4. The power saving device for a GPS receiver according to claim 3, wherein the oscillation sensor is a mercury oscillation switch or a rolling ball oscillation switch.

5. A saving method for a GPS receiver, comprising following steps:
(1) a information record and/or output device counting a moving time and a moving speed of the GPS receiver based on positional data sent out by the GPS receiver;
(2) detecting the moving time and the moving speed in a way of continuing the detection in case of the moving time and the moving speed do not exceed a respective preset value and entering next step in case of said moving time and said moving speed exceeding said respective preset value;
(3) the position and/or output device sending out the OFF and the ON signals sequentially based on a set time interval; and
(4) the power controller controlling the GPS receiver to be OFF or ON based on the OFF and the ON signals.

* * * * *